May 19, 1953 — J. W. WOOLF — 2,639,336

REEL DRIVING AND CONTROL MECHANISM

Filed Feb. 26, 1947 — 3 Sheets-Sheet 2

Fig. 2.

Inventor:
James W. Woolf.
by
Louis A. Maxson.
Attorney.

May 19, 1953

J. W. WOOLF 2,639,336

REEL DRIVING AND CONTROL MECHANISM

Filed Feb. 26, 1947

Inventor:
James W. Woolf.
by
Louis A. Maxson.
Attorney.

Patented May 19, 1953

2,639,336

UNITED STATES PATENT OFFICE 2,639,336

REEL DRIVING AND CONTROL MECHANISM

James W. Woolf, Franklin, Pa., assignor to Joy Manufacturing Company, a corporation of Pennsylvania Application February 26, 1947, Serial No. 731,121

17 Claims. (Cl. 191—12.2)

My invention relates to reel driving and control mechanisms, and more particularly to reel driving and control mechanisms associated with self-propelled vehicles.

It is customary to provide mine locomotives and "shuttle cars" with cable winding reels upon which substantial lengths of electric cable are wound, so that these vehicles may operate at points separated by substantial distances from the ends of the trolley wires in mine passageways. Drives for such reels have included provision for causing the winding in of the cable under a relatively high tension when the vehicle moves towards the point of connection of the extremity of the cable which can be pulled off of the reel, and provision has also been made, as in the John D. Russell application, Ser. No. 552,536, filed September 2, 1944, and since issued on June 14, 1949, as Patent No. 2,472,860, for enabling cable to be drawn off of the reel under a lesser tension when it is necessary for the vehicle to move away from the point of attachment of the cable, this latter provision being accomplished, in accordance with the specific disclosure of said Russell application, by variation in the position of a sheave-carrying arm from which the cable passes from the vehicle to the point of attachment.

It is desirable that when the vehicle is standing still, with power shut off from its wheel-driving motors and the reel stationary, resistance shall be in series with the armature of the reel driving motor, thereby to reduce heating. Moreover, it is desirable that whenever either of the forward or reverse starting switches for the propelling motor or motors is moved towards closed position, assuming that the vehicle is still stationary, full torque shall be applied by the reel driving motor to the reel, so that in the event that the vehicle is to be moved in the direction where winding in will be necessary the cable shall be under the desired tension immediately upon the starting movement of the vehicle. Depending upon the relation of the vehicle to the point of cable attachment closing of either switch may cause the vehicle to move in a direction to require winding up of the cable. It is, moreover, desirable that arrangements be provided so that in the event that the truck wheels start to rotate in such a direction as to occasion the drawing of cable off of the reel, there shall immediately be effected a reinsertion of the resistance in the reel driving motor circuit, so that as cable is drawn off of the reel it may be drawn off under a reduced tension. It is further desirable that in the event that the vehicle shall be allowed to coast with both of the operator controlled starting switches for the propulsion motors in open position, there shall be established, unless the vehicle be coasting in a direction to cause unwinding of the cable, a circuit which shall cause the reel driving motor to exert its higher torque, and it is desirable, with respect to this arrangement, that if the vehicle shall coast in a direction to necessitate the drawing of cable off of the reel, the torque of the reel driving motor shall be automatically reduced.

A desirable arrangement for controlling the reel driving motor of a vehicle of the type described and for assuring the application of adequate torque to the reel driving motor when a winding in operation is necessary and a reduction in the torque exerted by the reel driving motor when cable is to be drawn off of the reel may, according to my invention, include a circuit for connecting the reel driving motor, with resistance in series with its armature, to the power lines when the main line switch through which power is transmitted to the vehicle is closed, a solenoid control switch closable to cut out the resistance in series with the armature, as by short-circuiting such resistance, and means for controlling the supply of current to such solenoid including switch devices closable to effect the supply of current to said solenoid prior to and concurrently with the supply of current to the vehicle propulsion motors, switch means controlled by the direction of rotation of the reel and arranged in the circuits controlled by said forward and reverse switch devices and operative to interrupt such circuits if the reel is turned in an unwinding direction but when the reel is stationary or turning in a winding in direction maintaining circuit connections so that said forward and reverse switch devices can establish and maintain circuits through said solenoid, and further switch means closed whenever the wheels of the vehicle are turning for establishing connections parallel to the connections established by said forward and reverse switch devices so that even when the vehicle is coasting in a direction in which there would be danger of the cable being run over full torque will be applied to the reel driving motor, even though both said forward and said reverse switch devices are open.

It is an object of my invention to provide an improved reel driving and control mechanism. It is another object of my invention to provide an improved reel driving and control mechanism for self-propelled vehicles having improved control means including switch devices associated with the propulsion motor control and switch means governed by the direction of reel rotation for providing control by one or another of said switch devices and by said switch means for the torque exerted by the driving motor for the cable reel. Again, it is an object of my invention to provide an improved reel driving and control mechanism for self-propelled vehicles having improved control means including switch devices associated with the propulsion motor control and switch means governed by vehicle wheel rotation for establishing parallel circuits for controlling reel driving motor torque, whereby both during propulsion and during coasting the torque of said reel driving motor may be suitably controlled. A further object of my invention is to provide an improved reel driving and control mechanism for self-propelled vehicles having improved control means including switch means governed by vehicle wheel rotation and switch means governed by the direction of reel rotation for providing control during coasting of the torque exerted by the reel driving motor. Still another object of my invention is to provide an improved reel driving and control mechanism for self-propelled vehicles having improved control means including switch devices associated with the propulsion motor control, and switch means governed by vehicle wheel rotation for establishing parallel circuits for controlling the torque exerted by the reel driving motor, and further including in each of said circuits, switch means governed by the direction of reel rotation, whereby both during propulsion and coasting and during winding in and unwinding of cable and regardless of the direction of operation of the vehicle, the torque of the reel driving motor may be properly controlled. Other objects and advantages of my invention will hereinafter more fully appear.

In the accompanying drawings, in which for purposes of illustration one embodiment of my invention is shown, Fig. 1 is a plan view of a "shuttle car," to illustrate relations of parts.

Fig. 2 is a diagrammatic view of an apparatus in which my invention is incorporated.

Figure 1:
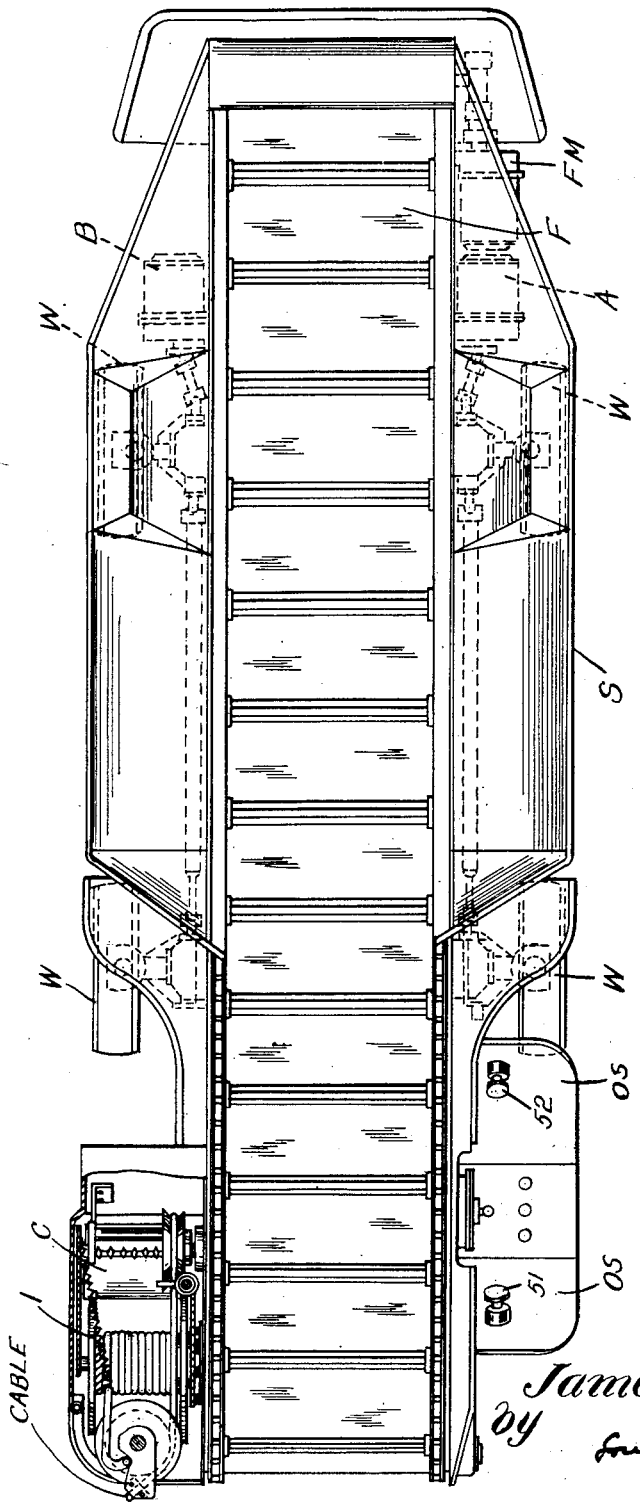

Referring to the drawings, and first to Fig. 1, there may be noted a "shuttle car" S having supporting wheels W adapted to be driven by motors A and B. There is a cable reel 1 mounted on the vehicle and having a cable CABLE wound upon it. The cable reel 1 is suitably driven by a motor C and connections not shown, but of a conventional character, conduct current from the cable reel to the controls which are grouped about and at the operator's seats OS. The "shuttle car" has a flight conveyor F driven by a motor FM. Other details need not be considered at this time.

Referring next to Fig. 2, there will be observed at 1 the cable reel, and at 2 and 3 power conductors which are electrically connected by conventional means not shown to the cable CABLE wound on the reel 1. A main line switch 4 having contact elements 5 and 6 is adapted to connect, when it is closed, the conductor 2 with a conductor 7 and the conductor 3 with a conductor 8. The vehicle has three motors with which we are now concerned, the motors, A, B and C. The motor FM for the drive of the conveyor need not be here considered. The propulsion motors A and B have armatures $Aa$ and $Ba$ and series fields $Af$ and $Bf$. The motor C, which drives the reel 1, has a shunt field $Cf$. Each of the motors A and B has reversing means associated with it, the motor A having a switch mechanism AF closable to effect forward propulsion and another switch mechanism AR, closable to effect rearward propulsion. The motor B has a forward propulsion effecting switch mechanism BF and a rearward propulsion effecting switch mechanism BR. These are conventionally illustrated and each of the several switch mechanisms AF, AR, BF and BR includes a double pole switch having magnetic actuating means therefor. The two motors A and B, which drive wheels at the opposite sides of the vehicle, have their fields $Af$ and $Bf$ respectively connected by conductors 9 and 10, through heating elements 11 and 12 respectively, to the coil 13 of a peak flow overload mechanism and to the conductor 7 which may be connected by the contact element 5 of the main line switch with conductor 2. The armature $Ca$ of the reel driving motor C and the shunt field $Cf$ of the cable reel driving motor are connected through a conductor 15, a heating element 16 and the coil 13, also to the conductor 7. The other connection from the armature $Ca$ is connected through a resistance CR to the conductor 8. The other connection of the shunt field $Cf$ is also to the conductor 8. The switch AF has an operating solenoid AFS, the switch AR, an operating solenoid ARS, the switch BF, an operating solenoid BFS and the switch BR, an operating solenoid BRS. When current is supplied to these solenoids, the switches with which they are associated are duly moved to closed position. Associated with each of the switches AF, AR, BF and BR are pilot switches, PAF, PAR, PBF and PBR, those (PAF and PAR) associated with the switches AF and AR being of the normally open, time delay closing type, and those with the switches BF and BR being of the normally closed, quick opening type. As these pilot switches may assume numerous forms, and as the time delay effect may be secured by a wide variety of mechanisms, I have illustrated the pilot mechanisms in a simple manner and indicated by the letters TD the fact that two of these pilot mechanisms are of the delayed closure type. A delay on the order of half a second is illustrative of the delay desired. Suitable pilots are disclosed in my copending application Ser. No. 701,956, now abandoned.

The conductor 2 is connected through a fuse 20 to a conductor 21 which is connectible by a normally closed, manually openable "safe off" switch 22 with a conductor 23. This conductor branches, and one of its branches 24 leads to a contact 25 carried by a quick closing, normally open switch 26, which is adapted to be closed when the main line switch 4 is closed. A manually operable main starting switch 27 is closable to connect the other branch 28 of the line 23 with a line 29 from which a number of parallel conductors are led to various points of use. A conductor 30 having between its ends a temperature controlled switch 31 governed by the heaters 11, 12 and 16 and a switch 32 operated by the overload coil 13 leads to an operating solenoid 33 of the main line switch; and the other side of this solenoid 33 is connected by a conductor 34 to a conductor 35 which, through a fuse 36, is connected to the main line conductor 3. When the pilot switch element 26 is moved to closed position, upon closing of the main line switch, it establishes a circuit in parallel with the switch 27 between the conductors 24 and 29, through a conductor 37.

Provision is made to permit both of the motors A and B to be connected for forward operation or for rearward operation, and for both motors initially to be connected through a resistance 38 to the conductor 8, and for their subsequent connection, through a shunting circuit 40 having a switch 41 therein, to the conductor 8, to short circuit the resistance 38.

The cable reel driving motor C has, as has been previously noted, a resistance CR connected in series with its armature Ca between the conductors 15 and 8, and this resistance is adapted to be shorted out by a switch 43 and a conductor 44 when an operating coil 45 is energized.

A conductor 46 leads from the junction point of the conductors 34 and 35 to positions convenient for the establishment of a number of circuits through it.

It is desirable, as previously indicated, that whenever the cable is to be wound in by the reel driving motor C, the resistance CR be shunted out, as will be effected by closure of switch 43, but that, when cable is to be pulled off of the reel, the switch 43 shall be opened and the torque of the motor be very substantially reduced by the cutting back in of the resistance CR. Accordingly, I have made provisions, which I shall shortly more fully explain, including a directional switch 50, two, herein foot operated, switch devices 51 and 52 and a switch 53 so connected with a vehicle wheel that whenever the vehicle commences to move, regardless of direction, the switch 53 will be closed.

The switch devices 51 and 52 each include a pair of contact elements connected for movement together. The contact elements of switch device 51 are designated 51A and 51B. Those of switch device 52 are designated 52A and 52B. The A switch element of each switch device closes before the B designated one, and opens after the B designated one opens. The A designated elements control the switch 43; the B designated ones control the propulsion motors.

While the propulsion arrangement is but illustrative, and other arrangements are within the scope of my invention as set forth in the claims, I shall describe the mode of operation of the propulsion mechanism in further detail, since it is a good one, before describing further the control system for the switch 43.

The conductor 29 has a branch 60 adapted to be connected by the switch element 51B with a conductor 61. From this conductor 61, a conductor 61a leads to the operating coil AFS, and a conductor 61b leads to the operating coil BFS. These operating coils are connected together at their other ends by a conductor 62 which is connected by a further conductor 63 to the normally closed pilot switch PBR associated with the switch mechanism BR. Assuming that the switch 27 has been closed and that the main line switch is closed, and that the switch 51B is closed, there will then be established a circuit from the conductor 2 through the fuse 20, conductor 21, normally closed switch 22, conductors 23 and 24, switch 26, conductors 37 and 29, branch conductor 60, foot operated switch 51B, conductor 61, conductors 61a and 61b to the operating coils AFS and BFS, and, in the case of switch AFS, through the further conductor 62, the conductor 63, through then closed pilot switch PBR, and through the conductor 46, conductor 35 and fuse 36 back to the line 3. As a result, the switches AF and BF will be closed and the motors A and B will be operated, by current which must pass through the resistance 38, to propel the vehicle in a forward direction, namely in a direction normally to make it necessary to pay out cable from the reel. As the switch 43 is closed at this time, the torque exerted by the motor C on the cable will be at full value, for the reason that current will flow through the armature Ca without having to pass through the resistance CR.

As soon as the time delay pilot PAF closes—a half a second or so after the switch device AF closes—current will pass from the conductor 61 through a portion of the conductor 61b to a conductor 65, through the closed pilot switch PAF, a conductor 66 and a conductor 67 to the operating solenoid 68 of the switch 41 and close the latter, the other side of said solenoid 68 being connected by a conductor 69 to the return line 46. When the switch 41 is closed, the resistance 38 will be short-circuited and the motors A and B will drive the wheels of the vehicle at full speed.

It may be noted that the switch device 52 includes a switch element 52B which is adapted to establish a circuit between a conductor 70 branching off of the conductor 29 and a conductor 71 which has branches 71a and 71b leading respectively to the operating coils ARS, BRS, and also a third branch 72 leading to the time delay pilot mechanism PAR which when closed is adapted to supply current through a connection 73 to the line 67 for the purpose of cutting out the resistance 38 after the motors A and B have been started and commenced to speed up in the reverse direction. From the solenoids ARS and BRS, connections 75a and 75b lead to a conductor 76 and through the normally closed pilot PBF and a conductor 78 to the conductor 46.

It is unnecessary to detail at length the starting and bringing up to speed of the propulsion motors A and B in a reverse direction, as this will be obvious from what has already been described.

Again remembering that the reel driving motor C has power supplied to it with the current to its armature passing through the resistance CR as soon as the main line switch 4 is closed, it will now be possible advantageously to consider the specific controls for the current supply to the winding 45, which winding when energized effects closure of the switch 43 and shunting of the resistance CR.

Switches 51 and 52, as previously indicated, include respectively contact elements 51A and 52A which are adapted to be closed before the contact element 51B and 52B close. Contact element 51A is adapted to close a circuit between the conductor 29 and a branch conductor 81, and a conductor 82, while contact element 52A is adapted to establish a circuit between the conductor 29 and a branch conductor 83, and a conductor 84. The conductors 82 and 84 join at 85 and are connectible by a conductor 86 with the directional switch 50. This directional switch includes a movable contact element 87 and a stationary contact 88, which contacts 87 and 88 are in contact with each other except when the reel 1 is driven in an unwinding direction. The stationary contact 88 is connected by a conductor 89 with one end of the solenoid 45, while the other end of this solenoid is connected by a conductor 90 with the return conductor 46. The directional switch 50 is connected in any suitable manner so as to turn with the reel 1 and is shown in Fig. 2 as connected by a flexible drive element 92 which may take the form of a chain. The reel 1 is shown as driven by the motor C by another flexible drive member 93, but may obviously be connected in any suitable manner with the motor C. From the conductor 29 there leads another branch conductor 95 which is connectible by a switch element 96 with another conductor 97 which leads to and is electrically connected to the junction point 85. The switch element 96 is controlled by a device driven with the vehicle wheels in such manner that whenever the wheels rotate the switch element 96 will be moved to closed position regardless of the direction of wheel rotation. In Fig. 2 a centrifugal device driven by an element which rotates with a vehicle wheel is shown to make the mode of operation clear, this mechanism being designated 100 and illustrated as having weighted arms 101 drawn together by a spring 102 and rotated by an element 103 connected for rotation with a vehicle wheel. It is not necessary that this device shall be, however, centrifugally actuated, and an electrical device, designated 110 in Figs. 3 and 4, and of the general kind shown in the Owens Patent 2,141,278, may advantageously be used by having the alternatively contacted stationary contacts connected together and to the conductor 97, and by having the reversely movable contact of the device of the patent connected to the conductor 95. Similarly, a device of the general character of the Owens device (see Fig. 5) may be employed as the directional switch 50, by causing the movable contact normally to contact one of the stationary contacts and to be moved away from it only when the driving element is rotated in the direction in which motion would be imparted to it upon drive of the reel 1 in the unwinding direction.

Figure 3:
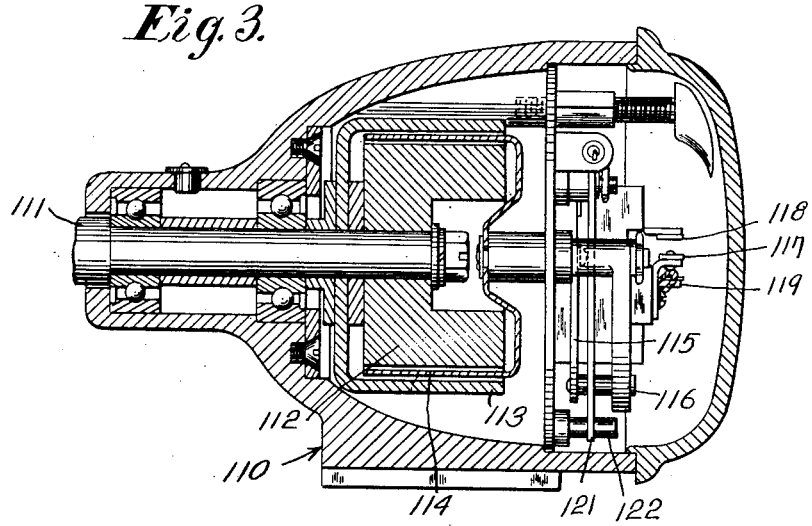
Fig. 3 is a central section showing a switch mechanism for establishing a circuit whenever the vehicle wheels are turning.
Figure 4:
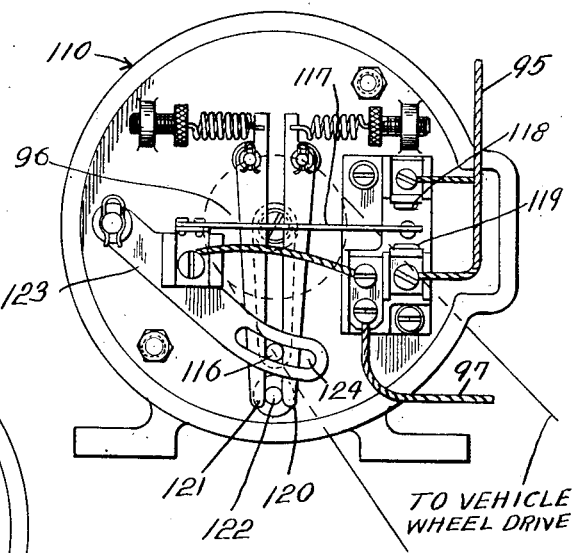
Fig. 4 is an end view of the switch mechanism of Fig. 3, with cap removed.
Figure 5:
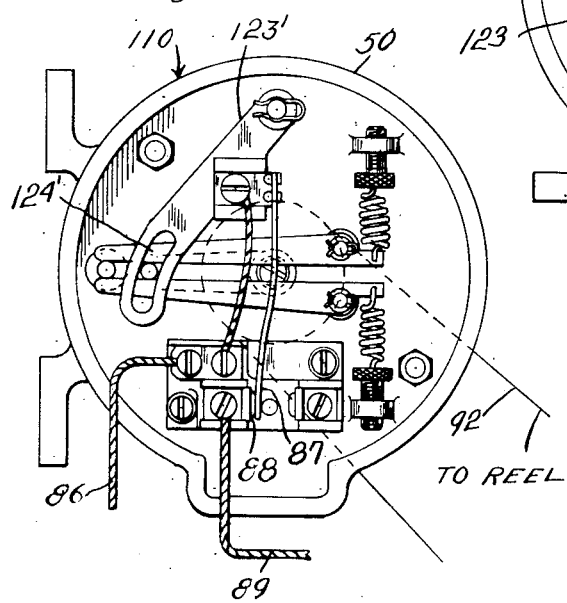
Fig. 5 is an end view of a directional switch controlled by the direction of reel rotation and having operating mechanism similar to the structure of Fig. 3.

As may be observed more fully by reference to the Patent 2,141,278, the devices illustrated in Figs. 3, 4 and 5 each comprise a shaft 111 whose rotation is to effect the desired contact. The shaft 111 rotates a magnet 112 which is energized with permanent north and south poles diametrically opposite to each other with respect to the axis of rotation. A hollow cup-shaped member 113, made of magnetic material, is also carried by the shaft 111. A cylindrical or cup-shaped armature member 114, made of electrically conducting material such as aluminum, is arranged to extend into the annular space between the members 112 and 113. Rotation of members 112 and 113 causes the armature 114 to rotate, as far as permitted, in the same direction as the members turn. Armature member 114 is rotatably supported and is connected to actuate a crank arm 115, carrying a pin 116 which actuates a switch element 117 in Fig. 4, or 87 in Fig. 5. The switch element is normally tightly maintained in a given position, a central position between stationary contacts 118 and 119 in Fig. 4 and against the stationary contact 88 in Fig. 5, when the shaft 111 is stationary. This is accomplished by spring moved arms 120 and 121 engaging a stationary pin 122 and having the pin 116 between them. The switch elements 117 and 87 are carried on pivoted arms 123 and 123' respectively and a cam slot 124 or 124' in the arm cooperates with the pin to move the switch element. In the device of Fig. 4, actuated with the vehicle wheels, the switch is moved towards and into contact with one or the other of the stationary contacts 118 and 119, depending on the direction of rotation of the vehicle wheels; but as 118 and 119 are both connected to conductor 95, what results is that as soon as the vehicle wheels commence to turn and as long as they turn, the contact 117 closes the circuit between the conductors 95 and 97. With respect to the device of Fig. 5, when the reel is turned in an unwinding direction, the circuit between 88 and 87 is opened. When the reel is turned in the other direction, the normally closed circuit is simply maintained. If further details are desired, reference may be had to the patent mentioned.

The mode of operation of the illustrative embodiment of the invention may be now very quickly summarized. When the switch 27 is closed, the main line switch 4 will be closed, and it will be held closed by the holding circuit including the switch 26 previously mentioned. The reel driving motor C will be energized and the current supply to its armature will be through its resistance CR so long as nothing is done to effect closure of the switch 43. Even with the resistance CR in series with the armature of the motor C, however, there will be sufficient power to turn the reel 1 in a winding in direction when winding in of the cable is possible.

When the operator desires to propel the vehicle in a forward direction, he will move the switch device 51 toward the left in Fig. 2. The contact element 51A will establish a circuit from line 2 through fuse 20, conductor 21, switch 22, conductor 23, conductor 24, switch 26, conductor 37, conductor 29, conductor 81, switch element 51A, conductor 82, conductor 86, contacts 87 and 88 of the directional switch 50, conductor 89, solenoid 45, conductors 90 and 46, conductor 35, fuse 36, to line 3. Accordingly, before the vehicle starts to move, the resistance CR will be shorted out, and full torque applied by the reel driving motor C to the reel 1, and all slack will be taken up in the cable. When the switch device 51 is moved further to the left, the vehicle will be started and brought up to speed in an obvious manner. If the vehicle starts to move in the direction which will require the cable to be wound up, the directional switch will maintain the circuit through it unbroken and the full torque of the reel driving motor will be applied. If, however, as the vehicle starts to move, cable must be pulled off of the reel, the directional switch will immediately be moved into a direction to move contact 87 away from stationary contact 88, and this will break the circuit through the solenoid 45 and result in the cutting of the resistance CR into circuit with the armature motor C.

As soon as the vehicle started to move, the switch 96 would be closed, but this would have no effect on the operation at this time because switch 51A would already be closed. If the switch device 52 be operated to effect rearward movement of the vehicle, operations will occur which will be obvious from the description given with respect to the operation of the switch device 51. When the reel comes to a stop after moving in a direction to unwind cable, the directional switch will already be in a position so that the resistance CR is in series with the motor armature Ca. If the vehicle comes to a stop after motion in a direction in which winding up of the cable is necessary, the contact 87 will be in engagement with the contact 88, but all of the feed circuits to the conductor 86 will be open so that the solenoid 45 will be de-energized and the resistance CR will be in series with the motor armature Ca when the vehicle is stationary. If the vehicle be allowed to coast, the switch 96 will be closed regardless of whether the switch device 51 or the switch device 52 be in a closed position, and therefore if cable requires to be wound on the reel, the resistance CR will be short-circuited and full torque delivered by the motor C, for the directional switch will be closed unless the reel is caused, by the pulling off of cable from it, to turn in a direction to open the directional switch.

From what has been said, it will be apparent that I have provided a very simple and effective control for the cable reels of vehicles such as "shuttle cars," mine locomotives, etc., that during the unwinding of cables, the torque exerted by the reel driving motor will be diminished, and whenever the reel driving motor is not driving the reel, heating of its windings will be diminished, yet torque adequate to start the reel into motion in the event that slack is introduced into the cable will be present. The improved mechanism also includes means for cutting the resistance out of the circuit through the motor armature before the propulsion motors are energized, and means operative, if the wheels of the vehicle turn, as due to coasting, when no power is being delivered under operator control to the reel driving motor, for increasing the torque automatically whenever winding in operation is called for.

While I have in this application specifically described one form which my invention may assume in practice, it will be understood that this form of the same is shown for purposes of illustration and that the invention may be further modified and embodied in various other forms without departing from its spirit or the scope of the appended claims.

What I claim as new and desire to secure by Letters Patent is:

1. A control system for a motor operating a vehicle-supported reel for a cable supplying electrical energy from an extraneous source to the vehicle, comprising a device operable to alter the torque of the cable reel motor and means for automatically controlling said torque altering device including a device responsive to vehicle motion along its path of travel and another and different device responsive to reel rotation, said device responsive to vehicle motion along its path of travel having positions for effecting high and low torque respectively and moved to its position for effecting high torque upon travel of said vehicle in either direction at any point in its path, and said device responsive to reel rotation controlling the effecting of high torque by said device responsive to vehicle motion and moved, upon reel rotation in an unwinding direction, to prevent such effecting.

2. A control system for a motor operating a vehicle-supported reel for a cable supplying electrical energy from an extraneous source to the vehicle, comprising a device operable to alter the torque of the cable reel motor and means for automatically controlling said torque altering device including a device responsive to vehicle motion along its path of travel and another and different device responsive to reel rotation and having a torque-transmitting connection with the reel by which its position is reversed as reel rotation is reversed, said device responsive to vehicle motion along its path of travel having positions for effecting high and low torque respectively and moved to its position for effecting high torque upon travel of said vehicle in either direction at any point in its path, and said device responsive to reel rotation controlling the effecting of high torque by said device responsive to vehicle motion and moved, upon reel rotation in an unwinding direction, to prevent such effecting.

3. A control system for an electric torque motor operatively connected to a vehicle-supported reel for a cable supplying electrical energy from an extraneous source to the vehicle, including switch means movable to alter the armature current of the torque motor and automatic controlling and operating means for said switch means including a control device responsive to the direction of rotation of the cable reel and another control device responsive to the movement of the vehicle along its path of travel, said control device responsive to vehicle motion along its path of travel having positions for effecting high and low torque respectively and moved to its position for effecting high torque upon travel of said vehicle in either direction at any point in its path, and said control device responsive to reel rotation controlling the effecting of high torque by said device responsive to vehicle motion and moved, upon reel rotation in an unwinding direction, to prevent such effecting.

4. In a control system for a motor operating a vehicle-supported reel for a cable supplying electrical energy to the vehicle, on which vehicle there is provided switch means for controlling propulsion of the vehicle, means operable to alter the torque of the cable reel motor, and controlling means for said torque-altering means including a circuit having to control the same switch means movable with said first mentioned switch means and closing before the latter closes and means controlled by the bodily movement of the vehicle in either direction and at any point in its path of travel for establishing a circuit for said controlling means for said torque altering means in parallel with the circuit which includes said second mentioned switch means.

5. In a control system for a motor operating a vehicle-supported reel for a cable supplying electrical energy to the vehicle, on which vehicle there is provided switch means for controlling propulsion of the vehicle, means operable to alter the torque of the cable reel motor, and controllinging means for said torque-altering means including a circuit having to control the same switch means distinct from but movable with said first mentioned switch means and closing before the latter closes, and means controlled by the movement of the vehicle in its path, regardless of its direction of movement or location in its path, for establishing a circuit for said controlling means for said torque altering means in parallel with the circuit which includes said second mentioned switch means, each of said circuits having therein a further switch means governed by the direction of cable reel rotation.

6. A control system for a motor operating a vehicle-supported reel for a cable supplying electrical energy to the vehicle, on which vehicle there is provided switch means for controlling propulsion of the vehicle, said control system including means operable to alter the torque of the cable reel motor, switch means movable with said first mentioned switch means and other switch means automatically actuated by bodily motion of the vehicle in either direction and at any point in its travel, said second and third mentioned switch means respectively adapted to establish connections for effecting operation of said torque-altering means to increase torque, the one when said vehicle is in motion under power and the other when it is coasting, and means governed by the direction of reel rotation for interrupting the control of said torque-altering means by said second and third mentioned switch means when the direction of vehicle motion is such as to require unwinding of cable from the reel.

7. A control system for a motor operating a vehicle-supported reel for a cable supplying electrical energy to the vehicle, which vehicle has control means for effecting selectively its forward and its rearward propulsion, said control system including means operable to alter the torque of the cable reel motor, switch means operable upon the control of said vehicle to effect forward propulsion by power, switch means operable upon the control of said vehicle to effect rearward propulsion thereof by power, each of said switch means closable before the application of power to said vehicle to effect propulsion thereof, switch means governed by the direction of reel rotation, and means for connecting each of said first two switch means separately with said last mentioned switch means in circuit with said torque altering means whereby said last mentioned switch means governs the control by each of the first two mentioned switch means of said torque-altering means.

8. A control system for a motor operating a vehicle-supported reel for a cable supplying electrical energy to the vehicle, which vehicle has control means for effecting selectively its forward and its rearward propulsion, said control system including means operable to alter the torque of the cable reel motor, switch means operable upon the control of said vehicle to effect forward propulsion by power, switch means operable upon the control of said vehicle to effect rearward propulsion thereof by power, each of said switch means closable before the application of power to said vehicle to effect propulsion thereof, switch means having means for effecting closure thereof whenever said vehicle is in transit, switch means governed by the direction of reel rotation, and means for connecting said several switch means with said torque altering means so that each of said first three mentioned switch means completes a control for said torque-altering means and said last mentioned switch means governs the control by each of the first three mentioned switch means of said torque-altering means.

9. A coacting control system for a motor operating a vehicle-supported reel for a cable supplying energy to a vehicle, comprising means operable to alter the torque of the cable reel motor, and means for controlling said last mentioned means for increasing the torque of said motor whenever the vehicle is in motion in a direction to call for winding in of the cable including a control device connected for operation directly from a wheel of the vehicle.

10. A coacting control system for a motor operating a vehicle-supported reel for a cable supplying energy to the vehicle comprising means operable to alter the torque of the cable reel motor, and means for controlling said last mentioned means for increasing the torque of said motor whenever the vehicle is in motion in a direction to call for winding in of the cable including a speed responsive control device in driven relation with a wheel of the vehicle and rotated by torque transmitted thereto from such wheel irrespective of the direction of rotation of the latter.

11. In combination, a cable winding reel, a motor for driving said reel to wind in cable and driven backwards by said reel when cable is pulled off of the latter, power supply means for said motor, and means for increasing the torque exerted by said motor when driving said reel in a winding direction and for reducing the torque exerted by said motor when it is driven backwards including an element movable to different positions to effect such changes in torque, an actuating member for said element, an element connected for rotation continuously with said reel and irrespective of the direction of rotation of the latter, and means for effecting a slipping drag between said rotated element and said actuating member about a common axis.

12. In a cable reeling mechanism, a cable reel, a motor for driving said reel in winding direction only, said reel as it is rotated in unwinding direction effecting drive of said motor backwards, and means including a device responsive to the direction of reel rotation and movable through a limited range between opposite stationary limit positions and actuated to such opposite limit positions by torque transmitted to it from the reel upon reversals of the rotation of the latter for automatically decreasing the motor torque when the reel is rotating in unwinding direction.

13. In a cable reeling mechanism, a cable reel, a motor for driving said reel in winding direction only, said reel as it is rotated in unwinding direction effecting drive of said motor backwards, and means including a device responsive to the direction of reel rotation for causing said motor to exert a high torque during rotation of said reel in winding direction and a lower torque during rotation of said reel in unwinding direction, said device having a part rotatable through a limited range between opposite stationary limit positions and connected with said reel so that said reel rotates said part as soon as it turns itself, and irrespective of its own direction of rotation, but oppositely during opposite directions of reel rotation, and said device when actuated by reversal of the reel from winding to unwinding automatically decreasing the motor torque immediately said reel rotates in unwinding direction.

14. In a cable reeling mechanism, a cable reel, an electric torque motor for rotating said reel only in cable winding direction, said reel as it rotates in unwinding direction effecting drive of said motor in the reverse direction, and means including a switch having an operating element connected with said reel for the reception of torque from the latter, and automatically responsive to the direction of reel rotation for automatically maintaining high torque on said motor when the reel is not turning and also during rotation of the reel in winding direction and for substantially reducing the motor torque immediately the reel rotates in unwinding direction.

15. In a cable reeling mechanism mounted to move with a vehicle to which it supplies power medium for operating the vehicle, a cable reel, a motor for driving said reel only in cable winding direction, said reel as it rotates in unwinding direction effecting drive of said motor backwards, and means for controlling the torque exerted by said motor including control means, automatically responsive to vehicle movement in either direction of travel of the vehicle and at any point in the path thereof, for maintaining, but subject to a further control governed by the direction of reel rotation, the motor torque at a value suited for rapid reeling, and a further control means automatically responsive to the direction of reel rotation for automatically effecting reduction of the motor torque when the motor is driven backwards by the reel.

16. In a cable reeling mechanism, a cable reel, an electric motor for driving said reel only in cable winding direction, said reel as it rotates in unwinding direction effecting drive of said motor backwards, and controlling means for the torque exerted by said motor for automatically maintaining high torque on said motor during rotation of said reel in winding direction and also when said reel is stationary, including an electric switch automatically responsive to reel rotation and moved by said reel in one direction when said reel rotates in one direction and in an opposite direction when said reel rotates in the other direction.

17. In a cable reeling mechanism movable with a vehicle to which it supplies power medium for operating the vehicle, a cable reel, a motor for driving the reel in winding direction only and adapted to be driven backwards by the reel as cable is drawn off of the latter, and control means for the torque exerted by said motor for maintaining high torque on the motor except when the reel is rotating in unwinding direction and for then reducing the motor exerted torque, including a control device automatically controlled by vehicle movement in either direction along its path and another control device automatically responsive to the direction of reel rotation, said device controlled by vehicle motion having positions for effecting high and low torque respectively and moved to its position for effecting high torque upon travel of said vehicle in either direction at any point in its path, and said device automatically responsive to the direction of reel rotation controlling the effecting of high torque by said device responsive to vehicle motion and moved, upon reel rotation in an unwinding direction, to prevent such effecting.

JAMES W. WOOLF.

References Cited in the file of this patent

UNITED STATES PATENTS

| Number | Name | Date |
|---|---|---|
| 821,317 | Sessions | May 22, 1906 |
| 1,150,911 | Waxbom | Aug. 24, 1915 |
| 1,843,743 | Shaffer | Feb. 2, 1932 |
| 2,141,278 | Owens | Dec. 27, 1938 |
| 2,359,123 | Krapf | Sept. 26, 1944 |
| 2,472,860 | Russell | June 14, 1949 |